(12) United States Patent
Patel et al.

(10) Patent No.: US 9,366,187 B2
(45) Date of Patent: Jun. 14, 2016

(54) SLINGER COMBUSTOR

(71) Applicant: Pratt & Whitney Canada Corp., Longueuil (CA)

(72) Inventors: Bhawan B. Patel, Mississauga (CA); Oleg Morenko, Woodbridge (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 793 days.

(21) Appl. No.: 13/794,950

(22) Filed: Mar. 12, 2013

(65) Prior Publication Data

US 2014/0260296 A1  Sep. 18, 2014

(51) Int. Cl.
| | |
|---|---|
| *F23R 3/06* | (2006.01) |
| *F02C 7/22* | (2006.01) |
| *F23R 3/38* | (2006.01) |
| *F23R 3/50* | (2006.01) |
| *F02C 3/14* | (2006.01) |

(52) U.S. Cl.
CPC ... *F02C 7/22* (2013.01); *F02C 3/14* (2013.01); *F23R 3/06* (2013.01); *F23R 3/38* (2013.01); *F23R 3/50* (2013.01); *F23R 2900/03041* (2013.01)

(58) Field of Classification Search
CPC ................ F23R 3/02; F23R 3/00; F02C 7/22; F02C 1/00; F02C 7/00
USPC .................... 60/200.1–771, 39.01–39.83, 776
See application file for complete search history.

(56) References Cited

U.S. PATENT DOCUMENTS

| | | | |
|---|---|---|---|
| 3,134,229 A | 5/1964 | Johnson | |
| 3,213,523 A | 10/1965 | Boehler | |
| 3,653,207 A | 4/1972 | Stenger | |
| 4,058,977 A | 11/1977 | Markowski | |
| 4,150,539 A | 4/1979 | Rubins et al. | |
| 4,192,139 A | 3/1980 | Buchheim | |
| 4,253,301 A | 3/1981 | Vogt | |
| 4,260,367 A | 4/1981 | Markowski | |
| 4,265,615 A | 5/1981 | Lohmann | |
| 4,292,801 A * | 10/1981 | Wilkes ...................... | F23R 3/34 60/733 |
| 4,301,657 A | 11/1981 | Penny | |
| 4,420,929 A | 12/1983 | Jorgensen et al. | |
| 4,498,288 A | 2/1985 | Vogt | |

(Continued)

FOREIGN PATENT DOCUMENTS

| | | |
|---|---|---|
| EP | 1775516 A2 | 4/2007 |
| FR | 2694799 A1 | 2/1994 |
| WO | 2013023147 A1 | 2/2013 |

*Primary Examiner* — Thomas Denion
*Assistant Examiner* — Shafiq Mian
(74) *Attorney, Agent, or Firm* — Norton Rose Fulbright Canada LLP (57) ABSTRACT

A slinger combustor has an annular combustor shell defining a combustion chamber having a radially inner fuel inlet for receiving a spray of fuel centrifuged by a fuel slinger. The combustion chamber has a fuel atomization zone extending radially outwardly from the fuel inlet and merging into a radially outwardly flaring expansion zone leading to a combustion zone. A plurality of nozzle air inlets are defined in the fuel atomization zone of the combustor shell. The nozzle air inlets have a nozzle axis intersecting the stream of fuel and a tangential component in a direction of rotation of the fuel slinger. A plurality of dilution holes are defined in the combustor shell and have a dilution axis intersecting the combustion zone. The dilution axis of at least some of the dilution holes has a tangential component opposite to the direction of rotation of the fuel slinger.

13 Claims, 6 Drawing Sheets

(56) References Cited

U.S. PATENT DOCUMENTS

| | | | |
|---|---|---|---|
| 4,499,735 A | 2/1985 | Moore | |
| 4,603,548 A | 8/1986 | Ishibashi et al. | |
| 4,898,001 A | 2/1990 | Kuroda et al. | |
| 4,996,838 A | 3/1991 | Melconian | |
| 5,127,229 A * | 7/1992 | Ishibashi | F23R 3/34 60/39.826 |
| 5,168,699 A | 12/1992 | McCarty | |
| 5,231,833 A | 8/1993 | MacLean | |
| 5,323,602 A * | 6/1994 | Defever | 60/804 |
| 5,475,979 A * | 12/1995 | Oag | F23C 6/047 60/737 |
| 5,653,109 A | 8/1997 | Overton | |
| 5,771,696 A | 6/1998 | Hansel | |
| 6,070,410 A | 6/2000 | Dean | |
| 6,253,538 B1 | 7/2001 | Sampath et al. | |
| 6,508,061 B2 | 1/2003 | Stuttaford | |
| 6,543,231 B2 | 4/2003 | Stuttaford et al. | |
| 7,448,218 B2 | 11/2008 | Heilos et al. | |
| 7,509,809 B2 | 3/2009 | Patel | |
| 7,748,221 B2 * | 7/2010 | Patel | F23R 3/10 60/752 |
| 7,942,006 B2 * | 5/2011 | Critchley | F23R 3/06 60/745 |
| 8,091,367 B2 * | 1/2012 | Alkabie | F23R 3/06 60/752 |
| 8,113,001 B2 | 2/2012 | Singh | |
| 8,307,661 B2 | 11/2012 | Harris et al. | |
| 9,127,843 B2 | 9/2015 | Prociw | |
| 2003/0177769 A1 | 9/2003 | Graves | |
| 2003/0213249 A1 | 11/2003 | Pacheco-Tougas | |
| 2005/0076650 A1 * | 4/2005 | Dudebout | F23R 3/54 60/804 |
| 2006/0042263 A1 | 3/2006 | Patel et al. | |
| 2006/0042271 A1 | 3/2006 | Morenko | |
| 2006/0196188 A1 | 9/2006 | Burd | |
| 2006/0218925 A1 | 10/2006 | Prociw | |
| 2007/0028620 A1 * | 2/2007 | McMasters | F23R 3/286 60/748 |
| 2007/0130953 A1 | 6/2007 | Burd | |
| 2007/0169484 A1 | 7/2007 | Schumacher | |
| 2007/0227149 A1 | 10/2007 | Biebel | |
| 2007/0227150 A1 * | 10/2007 | Alkabie | F23R 3/04 60/754 |
| 2007/0271926 A1 * | 11/2007 | Alkabie | F23R 3/06 60/772 |
| 2008/0104962 A1 | 5/2008 | Patel | |
| 2008/0105237 A1 | 5/2008 | Gandza | |
| 2009/0113893 A1 | 5/2009 | Li | |
| 2010/0212325 A1 * | 8/2010 | Condevaux | F23R 3/06 60/772 |
| 2010/0281881 A1 * | 11/2010 | Morenko | F02C 3/14 60/796 |
| 2011/0185699 A1 | 8/2011 | Danis | |
| 2011/0239652 A1 | 10/2011 | McMahan | |
| 2012/0125004 A1 | 5/2012 | Parsania et al. | |
| 2012/0234013 A1 * | 9/2012 | Overman et al. | 60/772 |
| 2012/0240588 A1 * | 9/2012 | Patel | F02C 3/16 60/772 |
| 2014/0260266 A1 | 9/2014 | Prociw | |
| 2014/0260297 A1 | 9/2014 | Prociw | |
| 2014/0260298 A1 | 9/2014 | Prociw | |
| 2015/0247641 A1 | 9/2015 | Patel | |

* cited by examiner

SLINGER COMBUSTOR

TECHNICAL FIELD

The application relates generally to gas turbine engines and, more particularly, to a slinger combustor.

BACKGROUND OF THE ART

Gas turbine engines used for powering aircrafts comprise a combustor in which fuel is mixed with compressed air and ignited to provide combustion gases for the turbine section of the engine. In a slinger combustion system, fuel is delivered and atomized through spraying fuel through a rotary fuel slinger. The rotary fuel slinger is designed for maximum fuel flow and optimized for cruise condition to improve the combustion efficiency and, thus, reduce smoke and gaseous emission. However, at low power levels, when the slinger rotates at lower speeds, fuel tends to not atomize properly, thereby resulting in low combustion efficiency, and high emission/smoke/particulates/unburned hydrocarbons.

Therefore, conventional rotary slingers have to be operated at high speed for properly atomizing the fuel. When, the slinger is rotated at low speeds, such as during starting and altitude relight conditions, the fuel atomization effect of the slinger is relatively poor.

SUMMARY

In one aspect, there is provided a slinger combustor for a gas turbine engine, the slinger combustor comprising: an annular combustor shell concentrically disposed about a central axis and defining an annular combustion chamber having a radially inner annular fuel inlet for receiving a spray of fuel centrifuged by a fuel slinger mounted for rotation about the central axis, a fuel atomization zone extending radially outwardly from the radially inner circumferential fuel inlet and merging into a radially outwardly flaring expansion zone leading to a combustion zone, a plurality of nozzle air inlets defined in the fuel atomization zone of the combustor shell, the nozzle air inlets having a nozzle axis intersecting the stream of fuel centrifuged by the fuel slinger and a tangential component in a direction of rotation of the fuel slinger, and a plurality of dilution holes defined in the combustor shell, the dilution holes having a dilution axis intersecting the combustion zone, and wherein the dilution axis of at least some of the dilution holes has a tangential component in a direction opposite to the direction of rotation of the fuel slinger.

In a second aspect, there is provided a method for mixing fuel and air in an annular combustion chamber defined between front and rear liners mounted about a central axis, comprising: centrifuging fuel in a radially outward direction through a radially inner annular fuel inlet of the combustion chamber, the fuel having a swirl component about the central axis; injecting air into the flow of fuel through air jet holes defined in the front and rear liners at a location adjacent to said radially inner annular fuel inlet, the air being injected with a swirl component in a same direction as that of the swirl component of the fuel, and injecting dilution air through dilution holes defined in the front and rear liners at a location downstream from the air jet holes, the dilution holes being oriented such that the dilution air flowing through at least one of said front and rear liners has a swirl component in a direction opposite to the swirl component of the fuel.

DESCRIPTION OF THE DRAWINGS

Reference is now made to the accompanying figures, in which.

DETAILED DESCRIPTION

Figure 1:
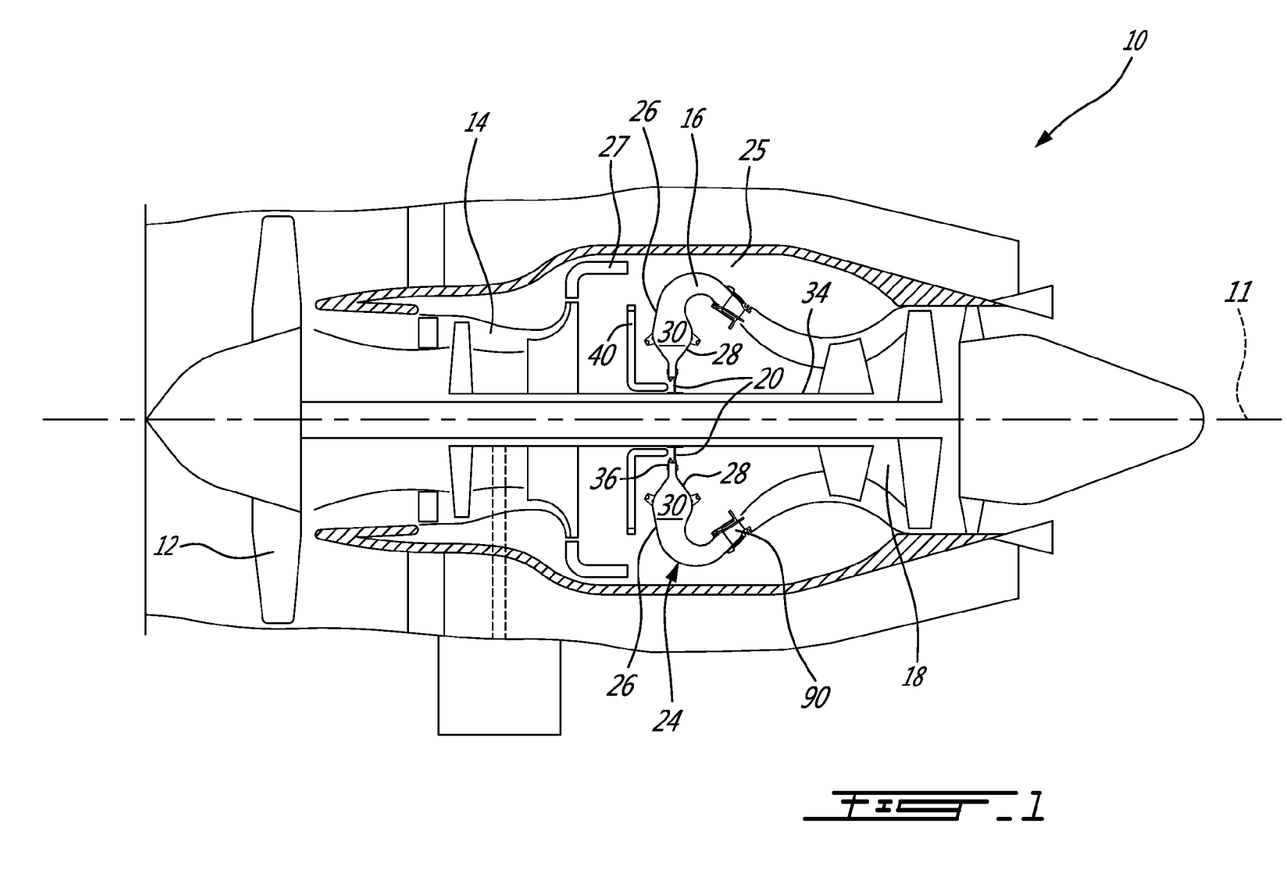
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 25 supplied with compressed air from a compressor diffuser 27. The combustor 16 has an annular combustor shell 24 concentrically mounted about the engine centerline 11 in the plenum 25. The combustor shell 24 may have an upstream or front annular liner 26 and a downstream or rear annular liner 28. The liners 26 and 28 are axially spaced-apart to define therebetween an annular combustion chamber 30. A rotary fuel slinger 20 is mounted for rotation with the engine high pressure shaft 34. The slinger 20 has a ring shaped-body and is axially aligned with a radially inner circumferential fuel inlet opening 36 defined in the combustor shell 24 between the upstream and downstream liners 26 an 28. The rotary fuel slinger 20 is configured to atomize and spray fuel radially outwardly through the circumferential opening 36 for ignition in a combustion zone 38 (FIG. 2) of the combustor chamber 30. Igniters (not) shown are provided for igniting the fuel-air mixture in the combustion zone 38. A fuel manifold 40 (FIG. 1) may extend into the plenum 25 for directing a flow of fuel from a fuel source (not shown) to the rotary fuel slinger 20. As the slinger 20 rotates, fuel is centrifuged through circumferentially distributed outlet holes 42 defined in the slinger 20, thereby atomizing the fuel into tiny droplets and distributing the fuel into the combustion zone 38 of the combustor chamber 30.

As mentioned herein before, rotary fuel slingers are best suited for high power conditions (e.g. take-off, climb and cruise power levels). At low power levels, fuel may not atomized properly, resulting in lower combustion efficiency. As will be seen herein after, combustion efficiency at low power levels may be improved by injecting air through small jet holes generally in the direction of the fuel injection. The air jets may be oriented to shear the fuel spray sheet from the slinger 20 while atomizing the fuel in addition to the pressure atomization from the slinger. In this way, fuel atomization may be improved at low power and at high power the fuel will be pre-mixed.

Figure 2:
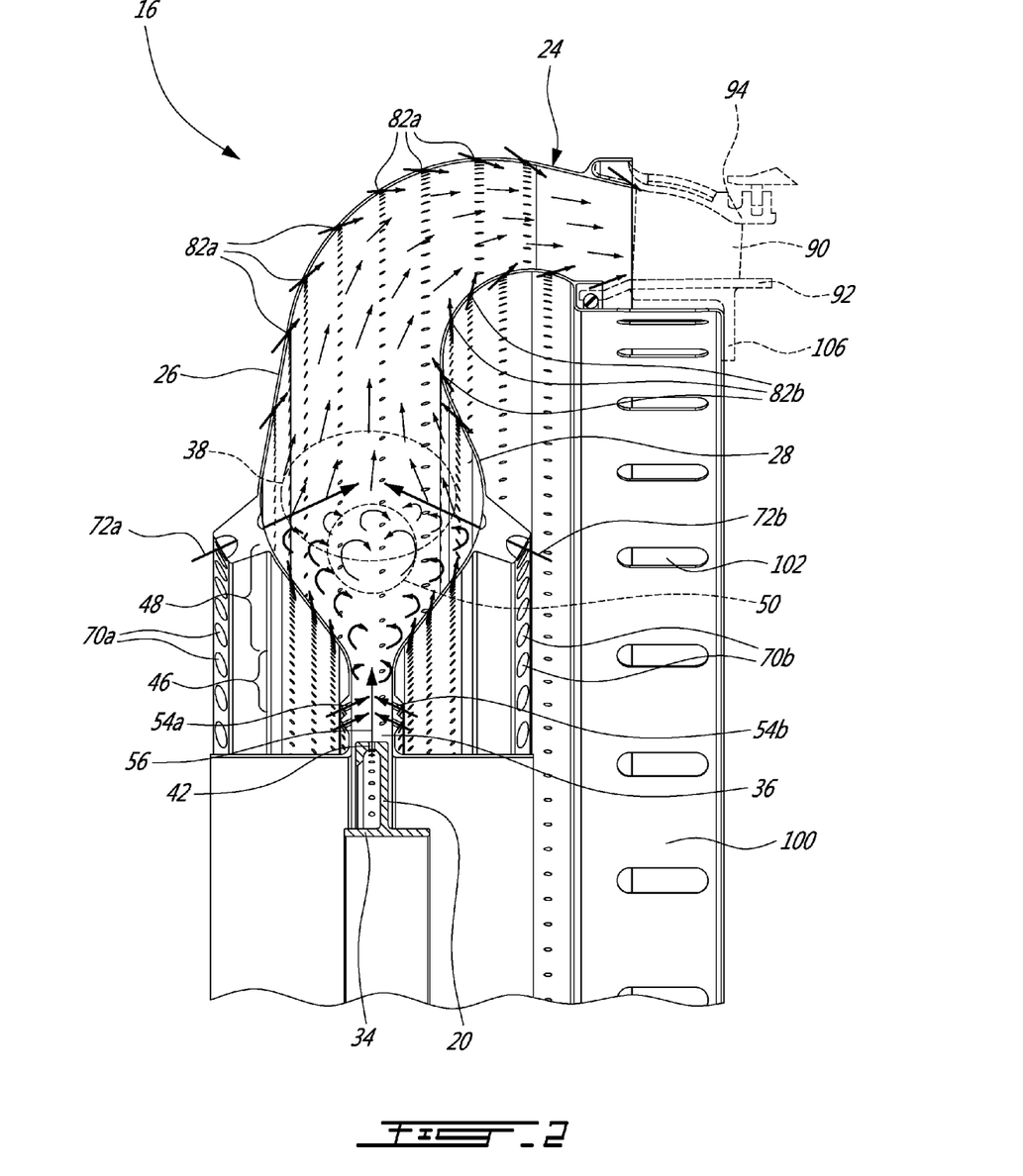
FIG. 2 is a cross-sectional view of the combustor section of the gas turbine engine illustrating the various zones of the combustor, including the fuel atomization zone, the expansion zone and the combustion zone.

Referring now more particularly to FIG. 2, it can be appreciated that the combustor shell 24 defines a substantially straight fuel atomization zone 46 extending radially outwardly from the circumferential fuel inlet opening 36. More particularly, the front and rear annular liners 26 and 28 have axially spaced-apart opposed inner ring portions extending in parallel radially outwardly from the circumferential fuel inlet opening 36 to define the fuel atomization zone 46. In the atomization zone 46, the fuel has a high swirling momentum in the direction of the slinger rotation and lower radial velocity components. The atomization zone 46 merges into a radially outwardly flaring expansion zone 48 configured to reduce the radial and swirling velocity components of the atomized fuel upstream of the combustion zone 38. In the expansion zone 48, the combustor liners 26 and 28 diverges from each other, thereby gradually increase the cross-sectional area of the combustion chamber 30 in a direction away from the fuel injection opening 36 (i.e. in a downstream direction relative to the combustion flow).

Figure 3:
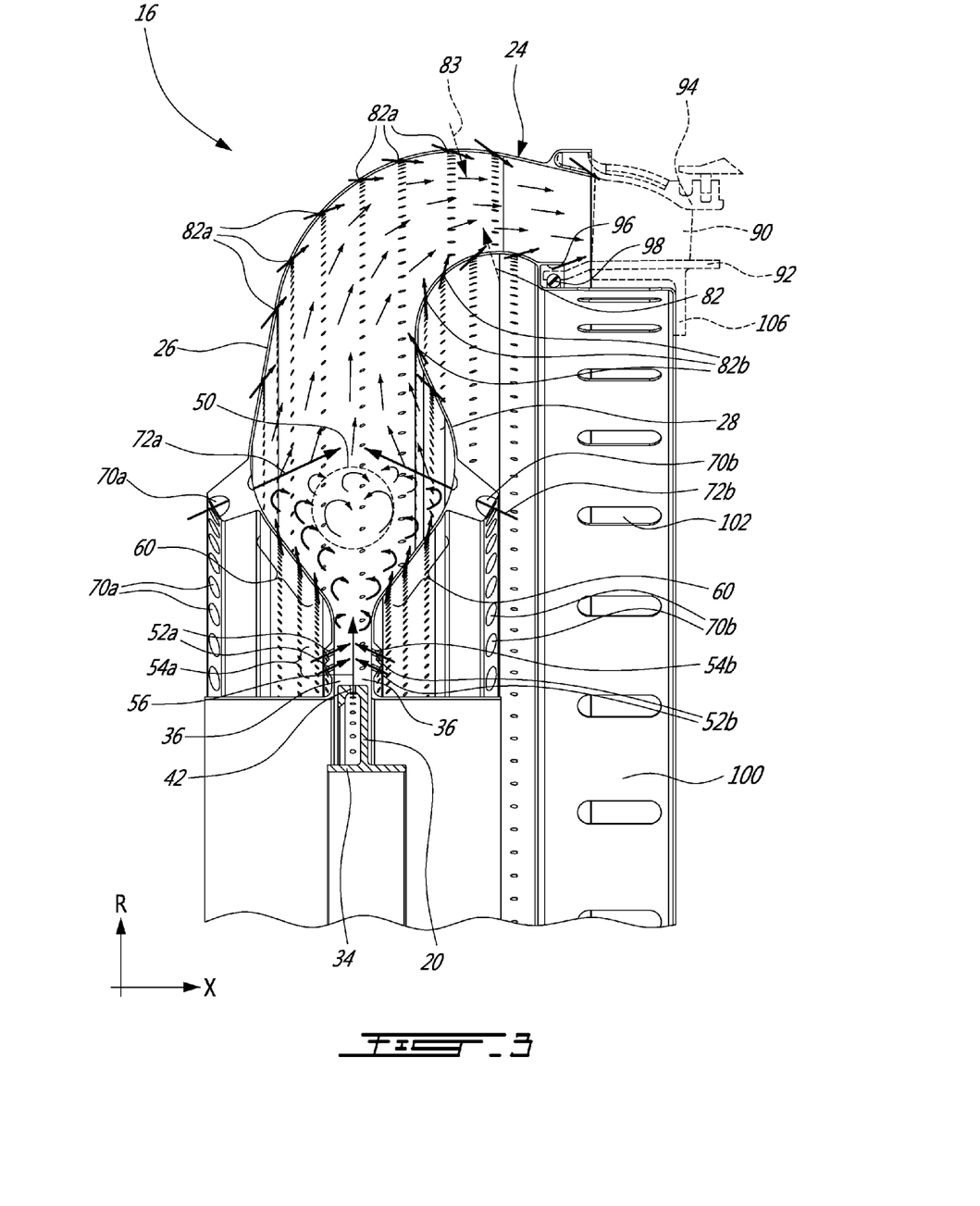
FIG. 3 is another cross-sectional view of the combustor section illustrating the upstream air injection pattern through the upstream or front liner of the combustor shell.

Now referring to FIG. 3, it can be seen that a set of nozzle air inlets 52a, 52b may be defined in the liners 26 and 28 for directing air jets 54a, 54b in the fuel atomization zone 46 of the combustion chamber 30. The air jets 54a, 54b are oriented to break the fuel spray sheet 56 ejected from the slinger 20, promote better fuel-air mixing and, thus, enhance fuel atomization. The axis of the nozzle air inlets 52a, 52b may have a tangential component in a circumferential direction corresponding to a rotation direction of the slinger (see air swirl flow field arrows 57 and slinger rotation arrow 58 in FIG. 4, they are both in the clockwise direction) to swirl the air into the fuel swirl, thereby providing for high level of swirl upstream of the combustion zone 38. In the illustrated embodiment, the set of nozzle air inlets 52a, 52b includes two concentric rows of circumferentially distributed holes in each the upstream and downstream liners 26, 28. The nozzle air inlets 52a in the upstream liner 26 and the nozzle air inlets 52b in the downstream liner 28 may be equidistantly distributed and aligned in direct opposed facing relationship across the fuel atomization zone 46 of the combustor chamber 30. It is observed that the central axis of each nozzle air inlets 52a, 52b may have axial, radial and tangential components. Referring to FIG. 3, it is observed that the air jets 54a, 54b are oblique relative to the radial fuel sheet 56. Hence, the air jets 54 have an axial and a radial component respectively along axes X and R shown in FIG. 3. The axial component of the upstream air jets 54a is opposite to that of the downstream air jets 54b. The radial component of both the upstream and the downstream air jets 54a, 54b is in the same direction as that of the fuel sprayed by the slinger 20 (i.e. radially outward). Finally, as mentioned herein before, the air jets 54a, 54b may have a tangential component in the direction of rotation of the slinger 20 (the clockwise direction as depicted by swirl flow arrows 57 in the embodiment shown in FIG. 4). The tangential component in the circumferential direction of the combustor may allow an increase residence time of the air and fuel mixture in the fuel atomization zone 46.

Hence, the combustor shell has numerous nozzle air inlets 52a, 52b in the fuel atomization zone 46 for impinging onto the radially outward fuel spray produced by the slinger 20, in close proximity to slinger fuel outlet, thereby encouraging rapid mixing of air and fuel. The orientation of the axis of the nozzle air inlets 52a, 52b relative to the fuel spray may create the necessary shearing forces between air jets and fuel stream, to encourage secondary fuel droplets breakup, and assist in rapid fuel mixing and vaporization.

As shown in FIG. 3, effusion cooling holes 60 may be defined in the upstream and downstream liners 26, 28 to form a film of cooling air over the inner surface of liners 26, 28 in the expansion zone 48. The effusion cooling holes 60 may have compound angles to direct the air in a direction tangential to the rotation direction of the slinger 20. Accordingly, the cooling air transpiring through the effusion holes 60 in the expansion zone 48 may have a swirl angle in the slinger rotation direction. The effusion flow is depicted by flow arrows 62 in FIG. 4. It can be appreciated from FIG. 4 that the cooling effusion flow 62 and the above described swirler flow 57 both have a tangential or swirling component corresponding to the slinger rotation direction 58 (the clockwise direction in the illustrated example).

Dilution/quench jet holes 70a, 70b are respectively defined in the upstream and downstream liners 26, 28 downstream of the effusion holes 60. According to one embodiment, the dilution jet holes 70a, 70b have a length/diameter ratio comprised between about 3.5 to about 4.5. As can be appreciated from FIG. 2, the dilution holes 70a, 70b are oriented and configured to direct dilution air jets 72a and 72b in the combustion zone 38 of the combustor 16. As shown in the drawings, the dilution jet holes 70a, 70b may be uniformly distributed on a circumferential array on each of the upstream and downstream liners 26, 28. However, it is understood that one or more circumferential rows of dilution holes 70a, 70b could be provided on each side of the combustor 16.

Figure 4:
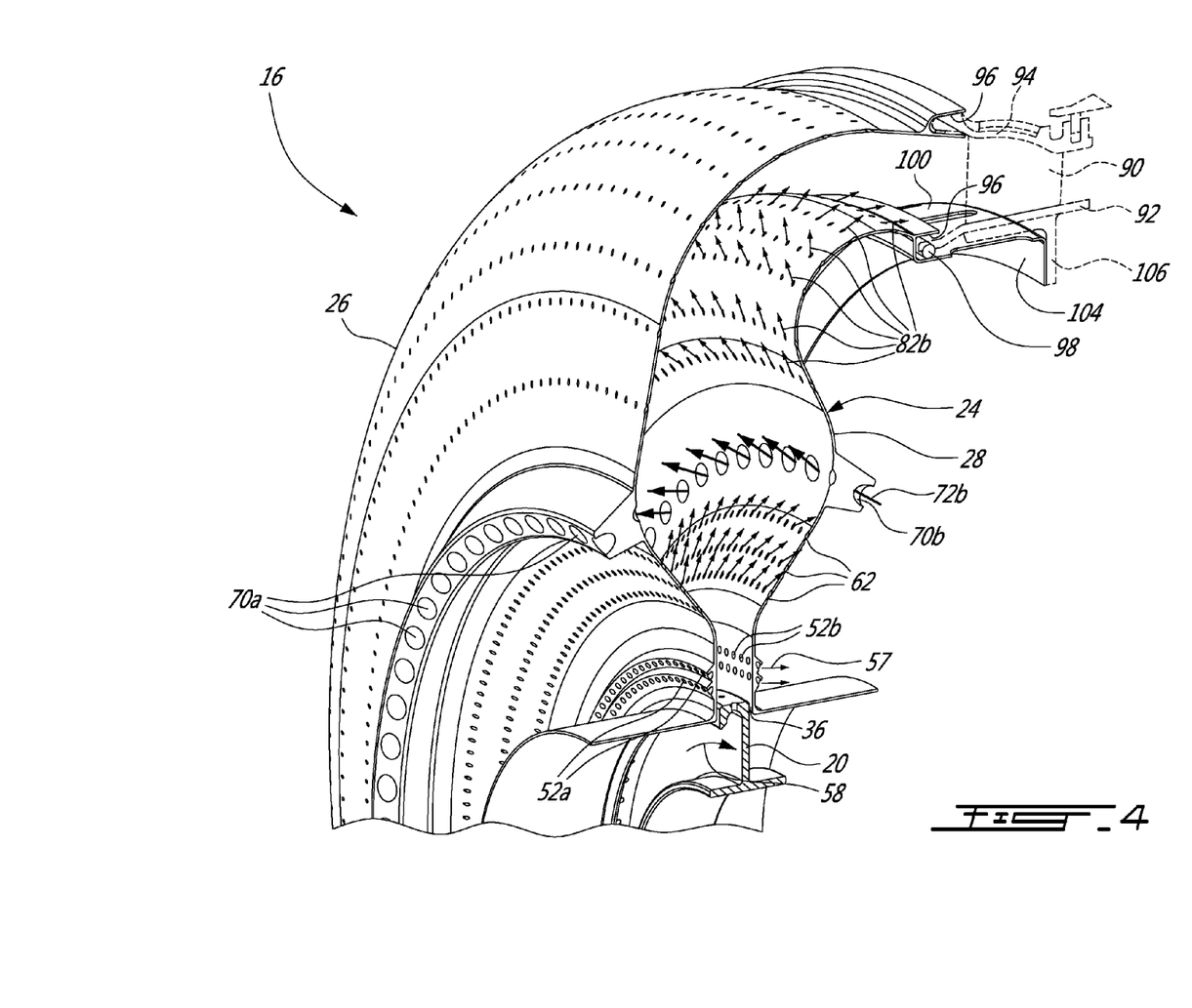
FIG. 4 is an enlarged, partial, front isometric view of the combustor section illustrating the downstream air injection pattern through the downstream or rear liner of the combustor shell.
Figure 5:
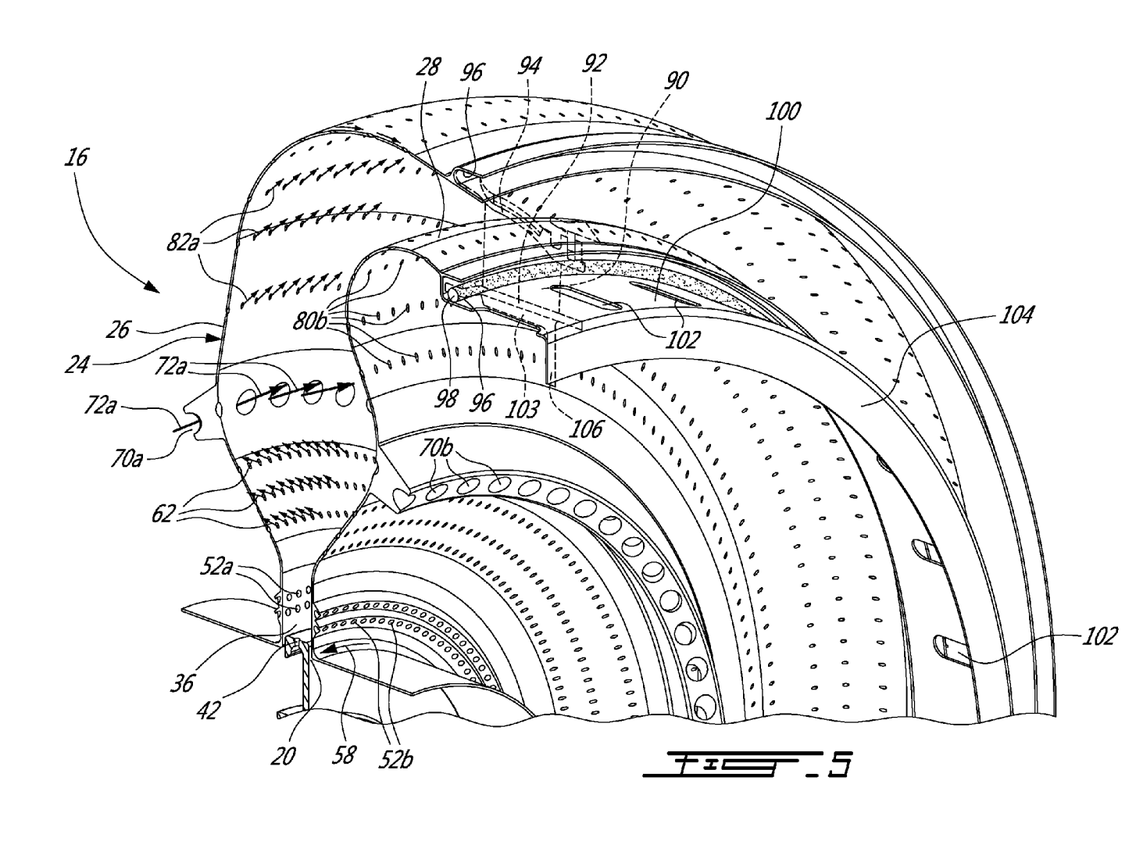
FIG. 5 is an enlarged, partial, rear isometric view of the combustor section illustrating the flow of air through the front or upstream liner of the combustor shell in the various zones of the combustion chamber.

Like the swirler air jets 54 disposed in the fuel atomization zone 46, the dilution air jets 72a, 72b (and thus the dilutions holes) may have axial, radial and tangential components. It can be appreciated from FIG. 3 that the axial component of the upstream dilution air jets 72a is opposite to that of the downstream dilution air jets 72b. The radial component of both the upstream and the downstream air jets 72a, 72b is in the same direction as that of the fuel sprayed by the slinger (i.e. radially outward). As shown in FIG. 5, it can also be observed that the upstream dilution air jets 72a may have a swirl angle or tangential component opposite to the slinger rotation direction depicted by arrow 58. Indeed, in the illustrated example, the upstream dilutions jets 72a are directed in a counterclockwise direction, whereas the slinger 20 rotates in a clockwise direction. Accordingly, the upstream dilution air is swirled in a direction opposite to that of the fuel sprayed by the slinger 20. Now referring to FIG. 4, it can be seen that the downstream dilution jets 72b may have a swirl angle or tangential component which is also opposite to the slinger rotation direction. However, according to another embodiment one of the upstream or downstream dilution jet holes 70a, 70b could be oriented to direct the upstream or downstream dilution jets 72a, 72b with a tangential component in direction of fuel swirling.

The above described air dilution flow field contributes to the formation of a low velocity zone 50 (FIGS. 2 and 3) which is suitable for flame stability and for propagating flame in the tangential direction relative to the fuel swirling direction. The opposite direction of tangential components between the dilution air and the fuel swirl may enhance fluid mixing to render the fuel and air mixture more uniform, which may lead to keeping the flame temperature relatively low (and related effects, such as lower NOx and smoke emissions, low pattern factor, and enhanced hot-section durability). Also the opposite tangential direction of dilution air holes 70a, 70b relative to the nozzle air holes 52a, 52b causes the creation of a recirculation volume immediately upstream of the penetrating dilution jets 72a, 72b further enhancing fuel-air mixing before burning, in a relatively small combustor volume.

The combustor shell 26 downstream of the dilution/quench jet holes 70a, 70b may be cooled by effusion cooling. To that end, effusion holes 80a, 80b may be defined in the upstream and downstream liners 26, 28 along a combustor zone extending downstream from the combustion zone 38. As shown in FIGS. 4 and 5, the effusion holes 80a, 80b are oriented to direct the effusion flow 82a, 82b in a circumferential direction opposite to the slinger rotation direction (i.e. opposite to the fuel swirling direction). The effusion holes 80a, 80b have compound angles to provide the desired axial, radial and tangential effusion flow components at the flow boundary surface of the liners 26, 28.

Also, as shown in FIG. 3, combustor Radial Temperature Distribution Factor (RTDF) jet holes 83 may be defined in the liners 26 and 28 just upstream of the outlet end of the combustor 16.

Figure 6:
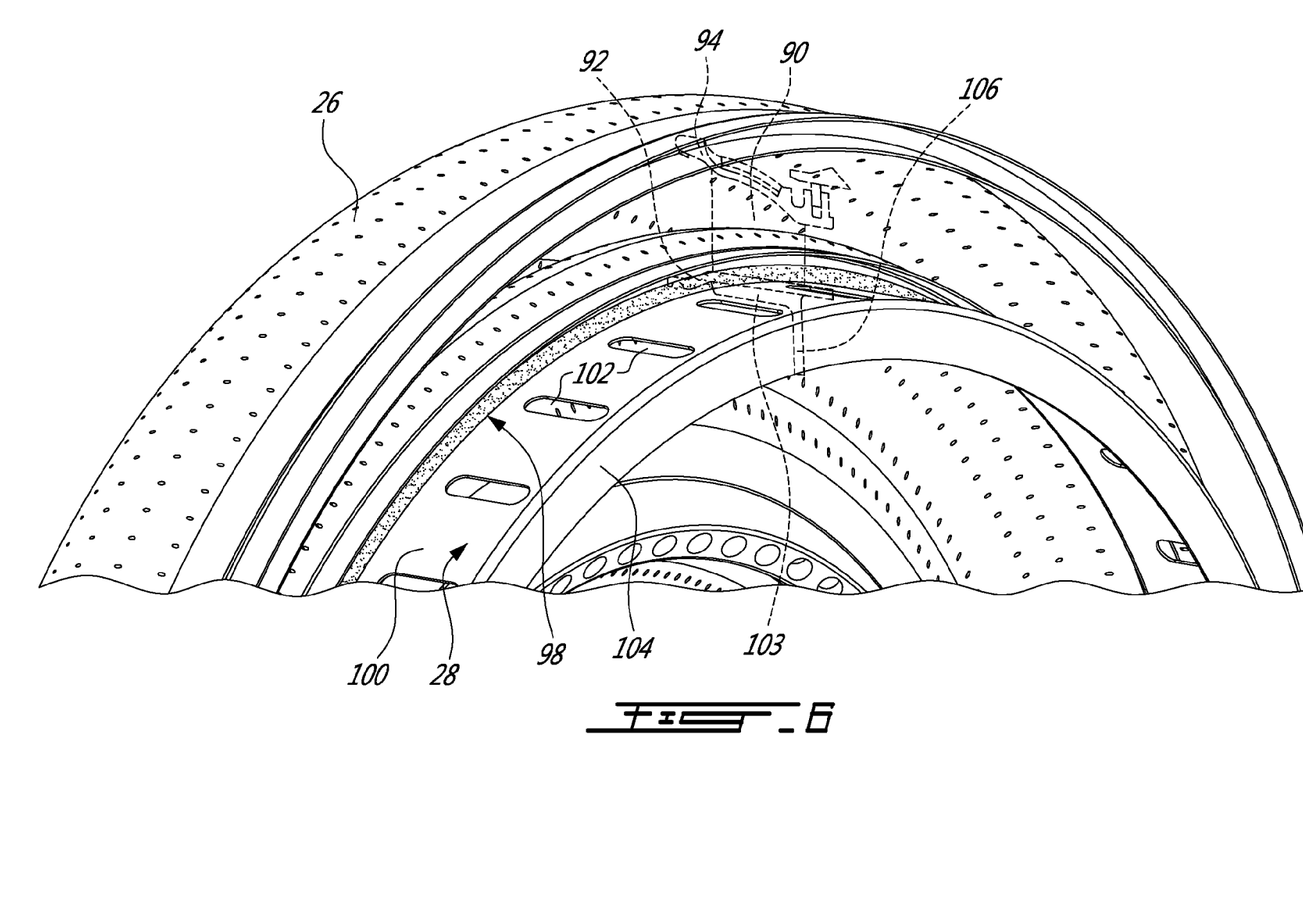
FIG. 6 is an enlarged, partial, rear isometric view of the outlet end of the combustor illustrating the assembly of high pressure turbine vanes to the combustor shell.

An array of circumferentially distributed high pressure turbine vanes 90 (only one shown in the drawings) is mounted to the downstream outlet end of the combustor shell for directing the combustion gases to a high pressure turbine rotor (not show). Each vane may have a hollow airfoil body for receiving a flow of cooling air. The vane airfoil is designed to maintain the swirl angle coming out from the diffuser 27. Due to the high swirling flow at the exit of the combustor 16, the HPT vane chord length can be reduced significantly.

The array of vanes 90 may be circumferentially segmented. Each segment may comprise a plurality of vanes extending radially between inner 92 and outer shrouds 94. As best shown in FIGS. 4 and 5, the forward end of the inner and outer shrouds 92, 94 project axially forwardly relative to the leading edge of the vanes 90 for sliding engagement inside axially extending annular slots 96 defined in the rear end of the combustor liners 26, 28, respectively. A rope seal 98 (only the radially inner rope seal being shown in the drawings) may be provided in each of the slots 96 to seal the sliding joint between the shrouds and the liners 26, 28. The vane segments or the vane ring may be mounted on an inner ring 100 projecting axially rearwardly from the rear liner 28. Circumferentially spaced-apart slots 102 may be defined in the inner mounting ring 100 for engagement with corresponding localization features 103 projecting radially inwardly from the inner shroud 92. An axially arresting annular lip 104 may project radially inwardly from the rear end of the ring 100 for axial engagement with a corresponding axially arresting tab 106 projecting from the rear end portion of the inner shroud 92.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A slinger combustor for a gas turbine engine, the slinger combustor comprising: an annular combustor shell concentrically disposed about a central axis and defining an annular combustion chamber having a radially inner annular fuel inlet for receiving a spray of fuel centrifuged by a fuel slinger mounted for rotation about the central axis, the combustor shell having front and rear annular liners, a fuel atomization zone extending radially outwardly from the radially inner circumferential fuel inlet and merging into a radially outwardly flaring expansion zone leading to a combustion zone, wherein the fuel atomization zone is provided in the form of a straight radially extending sub-chamber bounded by axially facing parallel inner peripheral ring portions of the front and rear annular liners, a plurality of nozzle air inlets defined in the fuel atomization zone of the combustor shell, the nozzle air inlets comprising at least one circumferential array of nozzle air inlets in each of the inner peripheral ring portions of the front and rear liners, each nozzle air inlet having a nozzle axis intersecting the stream of fuel centrifuged by the fuel slinger upstream of the radially outwardly flaring expansion zone, the nozzle axis having a tangential component in a direction of rotation of the fuel slinger, and a plurality of dilution holes defined in the combustor shell, the dilution holes having a dilution axis intersecting the combustion zone, and wherein the dilution axis of at least some of the dilution holes has a tangential component in a circumferential direction opposite to the direction of rotation of the fuel slinger.

2. The slinger combustor defined in claim 1, further comprising effusion holes wherein the effusion holes are defined in the expansion zone of the combustor shell, the effusion holes having a tangential component in the direction of rotation of the fuel slinger.

3. The slinger combustor defined in claim 1, further comprising effusion holes, wherein the effusion holes are defined in the combustor shell downstream from the combustion zone, the effusion holes having a tangential component in a direction opposite to the direction of rotation of the fuel slinger and opposite to the tangential component of the nozzle air inlets.

4. The slinger combustor defined in claim 1, wherein the nozzle axis of each of the nozzle air inlets on the front and rear annular liners has opposite axial components and similar radially outer components.

5. The slinger combustor defined in claim 1, wherein the dilution holes have a length/diameter ratio ranging from 3.5 to 4.5.

6. The slinger combustor defined in claim 1, wherein the front and rear annular liners being axially spaced-apart to define the combustion chamber therebetween, wherein the dilution holes comprise a first array of diffusion holes defined in the front annular liner and a second array of diffusion holes defined in the rear annular liner, the tangential components of the dilution axes of all the dilution holes of at least one of said first and second arrays being in a direction opposite to the direction of rotation of the fuel slinger.

7. The slinger combustor defined in claim 6, wherein the tangential components of the dilution axes of the dilution holes of both the first and second arrays are in a direction opposite to the direction of rotation of the fuel slinger.

8. The slinger combustor defined in claim 6, wherein the tangential components of the dilution axes of the dilution holes of the second array on the rear annular liner are in the same direction as the direction of rotation of the fuel slinger.

9. A method for mixing fuel and air in an annular combustion chamber defined between front and rear liners mounted about a central axis, comprising:

using a rotary fuel slinger, atomizing and spraying fuel in a radially outward direction through a radially inner annular fuel inlet of the combustion chamber, the fuel having a swirl component in a circumferential direction of the combustion chamber;

further atomizing the fuel in atomization zone by directing air jets into the flow of fuel through air jet holes defined in the front and rear liners at said radially inner annular fuel inlet, the air jets being injected with a swirl component in a same direction as that of the swirl component of the fuel, wherein the fuel atomization zone is provided in the form of straight radially extending sub-chamber bounded by axially facing parallel inner peripheral ring portions of the front and rear liners, and injecting dilution air through dilution holes defined in the front and rear liners at a location downstream from the air jet holes, the dilution holes being oriented such that the dilution air flowing through at least one of said front and rear liners has a swirl component in a direction opposite to the swirl component of the fuel.

10. The method defined in claim 9, wherein the swirl component of the dilution air injected through both the front and rear liners are opposite to the swirl component of the fuel.

11. The method defined in claim 9, wherein the swirl component of the dilution air injected through the front liner is opposite to the swirl component of the fuel, whereas the swirl component of the dilution air injected through the rear liner is in the same direction as that of the fuel.

12. The method defined in claim 9, further comprising effusion cooling respective inner surfaces of the front and rear liners between the nozzle air holes and the dilution holes, wherein effusion cooling comprises injecting effusion air through effusion holes defined in the front and rear liners, the effusion holes being oriented to cause effusion air to flow over the inner surfaces of the front and rear liners with a swirl component in the same direction as the swirl component of the fuel.

13. The method defined in claim 12, further comprising effusion cooling a portion of the front and rear liners downstream of the dilutions holes by injecting additional effusion air in said portion with a swirl component in a direction opposite to the swirl component of the fuel.

\* \* \* \* \*